United States Patent Office 3,151,164
Patented Sept. 29, 1964

3,151,164
NITRAZA THIA POLYMER COMPOSITIONS
George D. Sammons, Waco, Tex., assignor to Phillips Petroleum Company, a corporation of Delaware
No Drawing. Filed Jan. 25, 1960, Ser. No. 4,572
12 Claims. (Cl. 260—583)

This invention relates to nitraza thia polymer compositions. In one aspect this invention relates to methods of preparing said nitraza thia polymer compositions. In another aspect this invention relates to composite type propellant compositions containing at least one of said nitraza thia polymer compositions as an ingredient.

In recent years, great interest has developed in solid propellants for jet propulsion devices such as missiles, rocket motors, gas generators, and the like. One type of solid propellant which has recived considerable attention is that of the composite type, a typical composite propellant being one that uses an organic material as the fuel and binder, and a solid oxidant such as ammonium perchlorate or ammonium nitrate. There is a continuing search for materials that combine fuel elements, such as hydrocarbon elements, with a source of oxygen so that an oxidation reaction can take place between the constituents of the material. When particularly desirable elemental combinations exist, very high energy releases are obtained per unit weight and unit volume of the material, and such materials are very satisfactory for use in propellant compositions for the propulsion of rockets, generation of gases in gas generators, etc.

In composite type propellants, particularly when the propellant comprises a major proportion of a crystalline oxidizer component and a minor proportion of a fuel or binder component, the problem is presented of adjusting the physical properties of the propellant because of the small proportion of the binder material. Thus, it is difficult to provide suitable adhesion to the particles of oxidizer and the matrix of binder material is so tenuous that it is difficult to provide sufficient strength and elasticity in the propellant structure. Also, in many cases it is desirable and necessary to be able to cast or pour the propellant into a rocket case or mold and then cure same to a solid having suitable properties. In addition, since the binder component also forms a fuel, or part of the fuel, it must have suitable chemical properties for this purpose.

In the usual type of solid composite type rocket propellants, all of the structural strength is attributable to the binder, which at the same time serves as the fuel component. In such propellants, in order to obtain the proper combustion characteristics, the proportion of crystalline oxidizer component is very high, usually from 85 to 95 weight percent of the total propellant composition, leaving only 5 to 15 weight percent binder component. The result is that obtaining proper tensile strength and elongation presents serious problems and said properties are generally deficient.

I have discovered a group of new nitraza thia polymer compositions which combine hydrocarbon elements with a source of oxygen in the same molecule, and which are eminently suitable for use in composite type propellants. Said nitraza thia polymer compositions can be used, depending upon their molecular weight and specific compositions, as (a) plasticizers in propellant compositions, (b) as the principal ingredient in the binder component in composite type propellant compositions or (c) as starting materials for preparing nitraza thia polyurethane compositions which can be used as the principal ingredient in the binder component of composite type propellants.

Thus, broadly speaking, the present invention resides in (a) new nitraza thia polymer compositions of matter, (b) methods of preparing said polymers and (c) propellant compositions wherein at least one of said polymers is utilized as an ingredient.

An object of this invention is to provide new nitraza thia polymer compositions. Another object of this invention is to provide methods of preparing said nitraza thia polymer compositions. Another object of this invention is to provide new nitraza thia polymer compositions which are suitable for use as plasticizers in composite type propellant compositions. Another object of this invention is to provide new nitraza thia polymer compositions which are suitable for use as the principal ingredient in the binder component of composite type propellants. Another object of this invention is to provide nitraza thia polyurethane compositions which are suitable for use as the principal ingredient in the binder component of composite type propellants. Another object of this invention is to provide composite type propellant compositions having improved physical properties. Another object of this invention is to provide a propellant composition of the composite type wherein an increased proportion of binder component is utilized without sacrificing physical properties or ballistic properties. Another object of this invention is to provide a method of developing thrust by burning said new propellant compositions in a rocket motor. Other aspects, objects and advantages of the invention will be apparent to those skilled in the art in view of this disclosure.

Thus, according to the invention, there is provided a nitraza thia polymeric composition of matter characterized by the formula

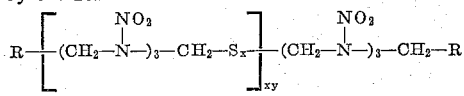

wherein: each R is selected from the group consisting of a chlorine atom and OH—CH$_2$—CH$_2$—O—, R′—O—, and R′—O—CH$_2$—CH$_2$—O— radicals wherein R′ is a primary alkyl radical of from 1 to 4 carbon atoms; $x$ is an integer of from 1 to 5; and $y$ is an integer of from 1 to 100.

Further according to the invention, there is provided a method of preparing said new polymers wherein the end groups, (R) in the above formula, are chlorine, which method comprises reacting 1,7-dichloro-2,4,6-trinitrazaheptane with a sulfide having the formula M$_2$S$_z$ wherein: M is selected from the group consisting of ammonium, sodium, potassium, lithium, cesium, and rubidium; and $z$ is an integer of from 1 to 5. Said nitraza thia polymers wherein the end groups (R) in the above formula are other than chlorine are prepared by utilizing said polymers wherein the end groups are chlorine as the starting material, as is described further hereinafter.

In the above described nitraza thia polymers of the invention, the value of $x$ depends upon the value of $z$ in the sulfide M$_2$S$_z$. Thus, when $z=1$, i.e., when a monosulfide such as Na$_2$S is used, $x=1$. When a polysulfiide such as sodium tetrasulfide Na$_2$S$_4$ is used, $z=4$ and $x=4$. Presently preferred nitraza thia polymers are those prepared from monosulfidies and tetrasulfides, i.e., these wherein $x=1$ and wherein $x=4$, respectively. When $x=1$ in the above formula, a preferred value for $y$ is from 1 to 3. When $x=4$, a preferred value for $y$ is 30 to 100.

The nitraza thia polymers of the invention will, in general, have molecular weights in the range of from 450 to 120,000. When $x=1$, the preferred polymers are those having an average molecular weight in the range of 450 to 1100. When $x=4$, the preferred polymers are those having an average molecular weight in the range of 10,000 to 120,000. The products obtained in the practice of the invention are presently believed to be mixtures of materials with a range of molecular weights. The molecular weights given above are therefore average values. The products of the invention can be fractionated using known techniques to obtain narrow range molecular weight products if desired.

As indicated above, the nitraza thia polymers of the invention can be utilized as ingredients in propellant compositions. Their particular utilization will depend primarily upon their molecular weights, i.e., the values of $x$ and $y$ in the above formula. For example: when $x=1$, and hydroxyl end groups are present, the polymers can be utilized as diol starting materials in the preparation of nitraza thia polyurethanes which can be used as the principal ingredient in the binder component of composite type propellant compositions; when $x=1$, and the end groups are R'—O—, the polymers can be utilized as plasticizers; and when $x=4$ or more, the polymers can be used per se as the principal ingredient in the binder component of propellant compositions regardless of the nature of the end groups.

1,7-dichloro-2,4,6-trinitrazaheptane, referred to hereinafter for convenience as GSX, is prepared by the reaction of 1,7-diacetoxy-2,4,6-trinitrazaheptane, referred to hereinafter for convenience as BSX, with hydrogen chloride. Said BSX is prepared by reacting nitric acid, acetic anhydride, and hexamethylenetetramine.

An example of the preparation of said BSX is as follows: 90 milliliters (2.15 mols) of 98–100 percent nitric acid is added carefully to 240 milliliters (2.35 mols) of acetic anhydride while stirring and cooling to 5–15° C. A solution of 66.8 grams (0.48 mol) of hexamethylene tetramine in 110 milliliters (1.93 mols) of acetic acid is then added while maintaining the temperature between 10 and 20° C. The mixture is then heated to 75° C. for 15 minutes, cooled as rapidly as possible to 60° C., and then allowed to cool overnight to room temperature. The precipitate is filtered off and washed with 20 milliliters of acetic acid. The product is recrystallized (without drying) from 250 milliliters of acetic acid, washed with 20 milliliters of methanol, then slurried with 100 milliliters of hot methanol, and then air dried. Yields in the order of 64 percent of theoretical, based on one mol per mol of hexamethylenetetramine, and having a melting point in the order of 155.0 to 155.5° C. are obtained by this procedure.

An example of the preparation of said GSX is as follows: 500 grams of BSX, 1250 milliliters of ethylene dichloride, and 235 grams of dry HCl are charged to a two-quart Hastelloy lined autoclave equipped with a 500 r.p.m. propeller type stirrer. The mixture in said autoclave is heated at 120° C. (250 p.s.i.g. maximum pressure) for 30 minutes. The mixture is then cooled by means of water circulating in a jacket surrounding the autoclave, the excess HCl is vented off, and crude GSX is crystallized out by chilling at 0° C. for two days. After washing twice with diethylether the yield of crude GSX is 378.8 grams and has a melting point of from 141–149° C.

Said GSX can be represented by the formula

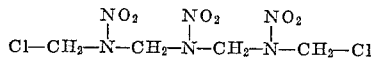

Said BSX can be represented by the formula

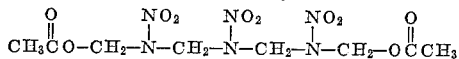

In one method for the preparation of the nitraza thia polymers of the invention wherein the end groups (R) are chlorine, i.e., the chloro nitraza thia polymers, by reacting GSX with the sulfides $M_2S_z$ (defined above), said reactants are reacted in a GSX to sulfide mol ratio in the range of 0.5:1 to 2.0:1, preferably in the range 1:1 to 1.5:1. The reaction can be carried out in the presence of any suitable organic solvent which is capable of dissolving GSX and the reaction product. Any solvent which is non-reactive with the reagents being used or the product being prepared, i.e., which is inert under the reaction conditions, is a suitable solvent. Examples of suitable solvents for the GSX are dioxane, tetrahydrofuran, and acetone.

As used herein, the term "dioxane" includes both 1,4-dioxane and 1,3-dioxane. The concentration of GSX in the solvent is usually in the range of 5 to 15 percent, the more concentrated solutions being preferred. The reaction can be carried out for any suitable period of time, usually from 1 to 24 hours, preferably 3 to 6 hours. The temperature of the reaction can be from 20 to 80° C., preferably 30 to 50° C.

Water is the solvent for the sulfide and concentration can be in the range of 10 to 40 percent, but is preferably saturated. In carrying out the reaction the water solution of the sulfide is preferably added to the dioxane solution of GSX as indicated hereafter in the examples. The reaction is preferably carried out in a reaction vessel provided with efficient stirring or other agitation means. Maximum stirring is preferred.

At the end of the reaction time the product is recovered by separating the aqueous and non-aqueous phases, said non-aqueous phase is then freed of water by any suitable method and the solvent is evaporated therefrom. An alternative method for recovering the product is to pour the organic solution into a relatively large volume of water to precipitate said product which is then separated and dried.

The nitraza thia polymers of the invention wherein the end groups (R) are R'—O—, i.e., the diether nitraza sulfa polymers, are prepared by reacting said chloro nitraza thia polymers with a primary saturated aliphatic alcohol containing from 1 to 4 carbon atoms per molecule, in an alcohol to polymer weight ratio in the range of 2:1 to 10:1, for a period of time within the range of 1 to 24 hours, preferably 3 to 6 hours, and at a temperature within the range of 40 to 90° C. Examples of suitable alcohols are: methanol, ethanol, propanol, and butanol.

The nitraza thia polymers of the invention wherein the end groups (R) are R'—O—CH$_2$—CH$_2$—O—, i.e., the diether oxa nitraza thia polymers, are prepared by reacting said chloro nitraza thia polymer with a glycol ether having the formula R'—O—CH$_2$—CH$_2$—OH wherein R' is a primary alkyl radical containing from 1 to 4 carbon atoms per molecule, in a glycol ether to polymer weight ratio in the range of 2:1 to 10:1, for a period of time within the range of 1 to 24 hours, preferably 3 to 6 hours, and at a temperature within the range of 50 to 100° C., preferably 60 to 85° C. Examples of suitable glycol ethers are ethylene glycol monomethyl ether, ethylene glycol monoethyl ether, and ethylene glycol monobutyl ether.

The nitraza thia polymers of the invention wherein the end groups (R) are HO—CH$_2$—CH$_2$—O—, i.e., the diol nitraza thia polymers, are prepared by reacting said chloro nitraza thia polymers with ethylene glycol in a glycol to polymer weight ratio in the range of 2:1 to 10:1, for a period of time within the range of 1 to 24 hours, preferably 3 to 6 hours, and at a temperature within the range of 40 to 100° C., preferably 60 to 85° C. The product can be separated by pouring the reaction mixture into water with stirring to extract excess glycol and hydrogen chloride. The product is then separated from said water, and after washing with water, can be dissolved in acetone, precipitated again by pouring into water, separating again and drying under vacuum.

The sulfides $M_2S_z$, used in the practice of the invention are commercially available products.

The following examples will serve to further illustrate the invention.

EXAMPLE I 5 grams of GSX was dissolved in 100 milliliters of 1,4-dioxane and a freshly prepared solution of sodium tetrasulfide, prepared by dissolving 1.56 grams of sulfur in a saturated aqueous solution containing 3.91 grams of Na$_2$S·9H$_2$O on a steam bath, was added to said dioxane solution of GSX. The mixture was stirred during the addition of said sulfide and stirring was continued at a temperature of about 40° C. for about 8 hours. The reaction mixture was then allowed to stand for about 16 hours. The sodium chloride (2.7 grams) was filtered off and the filtrate poured into 300 milliliters of distilled water. A latex milk resulted which was coagulated by the addition of dilute hydrochloric acid. The resulting polymer was separated, washed with distilled water, and dried. Said polymer weighed 3.0 grams (50.7 weight percent yield). The product was a soft rubber.

EXAMPLE II

A charge of 2,950 milliliters of 1,4-dioxane was heated to a temperature of 45° C. and 380 grams of recrystallized GSX added thereto. After solution was complete, one-third of a solution of 198 grams of $Na_2S \cdot 9H_2O$ in 316 milliliters of water was added over a 15 minute period to said solution, with stirring, and stirring and heating were continued for an additional 15 minutes. The other one-third portions of said sulfide solution was then each added to said GSX solution in the same manner, making a total reaction period of 1.5 hours. The dioxane phase containing the product was separated from the aqueous phase and dried over anhydrous magnesium sulfate. Solids were removed from the product-dioxane solution by filtering same through a bed of finely divided diatomaceous earth. The dioxane was evaporated from the filtrate to yield 956.7 grams of crude chloro nitraza thia polymer. This is one of the chloro nitraza thia polymers of the invention.

To said chloro nitraza thia polymer product there was added 1000 milliliters of ethylene glycol. After heating the resulting mixture for two hours at 65° C. under vacuum in a rotary film dryer, said mixture was poured into three liters of ice and water. The precipitated product was washed repeatedly with ice water and dried in a vacuum oven at 65° C. The completely dried product weighed 172 grams and was a viscous liquid.

The sample of diol nitraza thia polymer prepared as described above gave the following analysis:

| | Weight percent |
|---|---|
| C | 23.6 |
| H | 4.1 |
| N | 25.0 |
| S | 5.1 |

From this analysis, the degree of polymerization ($y$) was calculated as related to the polymer formula:

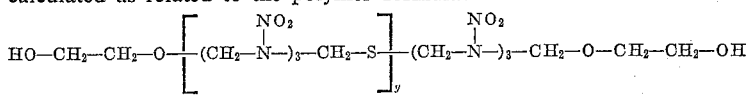

From the foregoing, a calculation for $y$ in the above diol formula gives the following result:

Calculated from S, $y=0.95$
Calculated from C, $y=1.04$

In the above Example II diatomaceous earth was used to filter solids from the dioxane-product solution. Any suitable inert solid filtering material can be used for this purpose. Examples of suitable other materials include kieselguhr, fuller's earth, natural clays, etc., as well as inert synthetic filtration materials.

EXAMPLE III 693 milliliters of ethylene glycol was added to the 374.76 grams of product obtained in Example II and the resulting mixture rotated in a vacuum rotary drier at 60° C. for one hour. Hydrogen chloride was removed during the course of the reaction. The reaction mixture was poured into a mixture of ice and water to further remove HCl, and precipitate the product. The water was decanted and the wet gummy mass remaining weighed 303 grams. After washing with two 500 milliliter portions of benzene, the weight of said mass was 258.8 grams. This product was dried under vacuum at 40–70° C. to a constant weight of 196.5 grams to give a clear tan colored viscous material. This is one of the diol nitraza thia polymers of the invention.

The diol nitraza thia polymers of the invention can be utilized to prepare nitraza thia polyurethanes by the interaction therewith of an organic polyisocyanate.

While organic polyisocyanates in general can be used in the practice of the invention, the diisocyanates are usually preferred because of their availability and ease of preparation. Said polyisocyanates should be liquid under the conditions of use. Representative polyisocyanates which can be used in the practice of the invention, include, among others, those given in Table I below.

*Table I*

Toluene-2,4-diisocyanate
Toluene-2,3-diisocyanate
Toluene-2,5-diisocyanate
Toluene-2,6-diisocyanate
Commercial mixtures of 2,4- and 2,6-toluene diisocyanate
1,6-hexamethylene diisocyanate
Triphenylmethane triisocyanate
1,5-decamethylene diisocyanate
Cyclopentylene-1,3-diiocyanate
Cyclohexylene-1,3-diisocyanate
Diphenyl-4,4'-diisocyanate
Diphenyl-3,3'-diisocyanate
Benzene-1,3'-diisocyanate
Benzene-1,4-diisocyanate
Benzene-1,2,4-triisocyanate
Toluene-2,4,6-triisocyanate
Benzene-1,3,5-triisocyanate
Benzene-1,2,3-triisocyanate
Toluene-2,3,4-triisocyanate
Polybenzylene polyisocyanate If desired a crosslinking agent can be used in preparing the nitraza thia polyurethane compositions of the invention. Said crosslinking agent serves to form crosslinks between molecules of the polyurethane, and also reacts with the organic polyisocyanate. When said nitraza thia polyurethanes are to be used as the principal ingredient in the binder components of the propellant compositions of the invention, it is usually preferred to use a crosslinking agent. Suitable crosslinking agents for use in the practice of the invention are the primary and secondary polyhydroxy compounds of the formula $R(OH)_n$ where R is a saturated acyclic radical containing from 3 to 6 carbon atoms, and $n$ is an integer of from 3 to 6.

Examples of said crosslinking agents includes, among others, the following: 1,2,3-propanetriol (glycol); 1,2,6-hexanetriol; 1,1,1-trimethylolpropane; erythyritol; pentaerthritol; ribitol; xylitol; sorbitol; and mannitol.

The actual composition in weight percent of the nitraza thia polyurethane compositions of the invention will, of course, depend upon the specific ingredients used in preparing the composition. However, it will always be based on the chemical equivalents of the nitraza thia diol present in the composition. Table II given below sets forth a general formulation which can be used as a guide in preparing the nitraza thia polyurethane compositions of the invention.

*Table II*

| Ingredients: | Chemical equivalents [1] |
|---|---|
| Nitraza thia diol | 1 |
| Polyisocyanate | 0.9–1.8 |
| Polyhydroxy compound (cross linking agent) | 0–0.6 |

[1] To convert to parts by weight, multiply by the equivalent weights (molecular weight divided by the number of active hydrogen atoms (OH groups) or the number of isocyanate groups in the molecule) of the individual compounds making up the composition. To convert parts by weight to weight percent divide the individual parts by weight by the total parts by weight and multiply by 100. In the event commercial compounds are used, it may be necessary to determine the equivalent weight experimentally.

In preparing the nitraza thia polyurethane compositions of the invention, the reaction conditions are in general those known to persons skilled in the art for the preparation of conventional polyurethanes. Any suitable mixing technique for bringing the reactants together can be employed. For example, the nitraza thia diol, the crosslinking agent (when used), and the polyisocyanate are placed in a suitable mixer such as a Baker-Perkins mixer, and mixed for about 1 to about 10 minutes at a temperature sufficient to maintain said ingredients in liquid phase, for example, 100 to 125° C. Any suitable mixing times and temperatures can be employed. After mixing, the composition can be poured into any suitable mold depending upon its intended use and then cured.

While the nitraza thia polyurethane compositions of the invention will cure at room temperature on standing, it is frequently desirable to include a curing catalyst in the composition. Suitable curing catalysts include metal complexes such as Ferrocene (dicyclopentadienyl iron), and 2,4-pentanedione complexes with cobalt, chromium, nickel or iron, ferric chloride, etc. Any suitable curing catalyst can be used in the practice of the invention and the invention is not limited to any specific curing catalyst. The amount of curing catalyst used, when used, will usually range from about 0.01 to 5 parts by weight per 100 parts by weight of the nitramine polyurethane. The actual curing temperatures and curing times employed will depend upon whether or not a catalyst is used, the amount of catalyst used, and the properties desired in the final nitraza thia polyurethane composition. The curing temperature will generally be in the range between 70 and 250° F., preferably between 110 and 170° F. The curing time will range from 2 to 3 hours when the higher curing temperatures are employed, to about 7 days when curing is effected at the lower temperatures.

As mentioned above, the nitraza thia polyurethane compositions of the invention can be used as the binder component in the propellent compositions of the invention. When so used, said binder component comprises a nitraza thia polyurethane composition of the type hereinbefore described and, in addition, there may be present one or more plasticizers, wetting agents, antioxidants, and a curing catalyst. The finished binder frequently contains various compounding ingredients. Thus, it will be understood that herein and in the claims, unless otherwise specified, the term "binder" is employed generically and includes various conventional compounding ingredients. The binder content of the total propellant composition will depend somewhat upon the technique employed in forming said propellant composition into propellant grains. When it is desired to prepare castable propellant compositions, the binder content will usually range from about 20 to about 60 weight percent of the total composition. When techniques other than casting techniques, such as molding, are to be used the binder content of the propellant composition can range from about 10 to about 60 weight percent of the total composition.

As indicated above the higher molecular weight nitraza thia polymers of the invention can be used per se as the principal ingredient in the binder component of the propellant compositions of the invention.

A general formulation for the binder component of the propellant compositions of the invention is as follows:

| Ingredient: | Parts by weight |
|---|---|
| Nitraza thia polymer or polyurethane | 100 |
| Plasticizer | 0–250 |
| Antioxidant | 0–25 |
| Wetting agent | 0–25 |
| Curing catalyst | 0–5 |
| Casting aid | 0–5 |

A more preferred formulation for the binder component of the propellant compositions of the invention is as follows:

| Ingredient: | Parts by weight |
|---|---|
| Nitraza thia polymer or polyurethane | 100 |
| Plasticizer | 25–250 |
| Antioxidant | 0–25 |
| Wetting Agent | 0–25 |
| Curing catalyst | 0.1–5 |
| Casting aid | 0–5 |

In general, any rubber plasticizer which is compatible with the nitraza thia polymers or polyurethanes of the invention can be used in said binder compositions. Materials which provide rubber having good low temperature properties are usually preferred.

Nitro substituted organic compounds are particularly valuable as plasticizers because they are high energy plasticizers, i.e., they make a contribution to the combustion processes themselves due to the oxygen and nitrogen contained therein. We have discovered a group of high energy plasticizers which are eminently suitable for use in high energy propellant compositions of the type disclosed and claimed herein. The high energy plasticizers of the invention are the dinitro and trinitro substituted paraffinic, and aromatic hydrocarbons containing from 2 to 6 carbon atoms per molecule, not more than one halogen atom per molecule, and wherein the carbon atoms to which said such substituents are attached are free of hydrogen atoms, and said halogen atom is selected from the group consisting of chlorine, bromine, and iodine.

Examples of said high energy plasticizers include, among others, the following: 1,1,1-trinitroethane; 2,3,3-trinitro-2-methylbutane; 2,2,3 - trinitro - 3 - chlorobutane; 1,1 - dinitro - 1 - chlorobutane; 1,1,1 - trinitropropane; 1 - bromo - 2,2 - dinitro - 3,3 - dimethylbutane; 1 - iodo-2,3-dinitro-2,3-dimethylbutane; 1,1,1-trinitrohexane; 2,2-dinitropropane; and 1-chloro-2,4-dinitrobenzene. Mixtures of said plasticizers can also be used in the practice of the invention. A mixture of 2,2-dinitropropane and 1-chloro-2,4-dinitrobenzene is a presently preferred plasticizer.

As indicated above, the nitraza thia polymers of the invention wherein the end groups (R) are R'—O—, or R'—O—CH$_2$—CH$_2$—O, i.e., the diether nitraza thia and the diether nitraza oxa thia polymers, can be used as plasticizers in the propellant compositions of the invention. Said polymers are particularly valuable plasticizers for the same reasons as said nitro substituted organic compounds.

Wetting agents aid in deflocculating or dispersing the oxidizer, Aerosol OT (dioctyl ester of sodium sulfosuccinic acid), lecithin, and Duomeen C diacetate (the diacetate of trimethylene diamine substituted by a coconut oil product) are among the materials which are applicable.

Antioxidants which can be used include catalin antioxidant CaO-6[bis(2-hydroxy-3-tertiary butyl-5-methylphenyl)sulfide] and 2,2-methylene-bis(4-methyl-6-tert-butylphenol); and the like.

While the nitraza thia polyurethane propellant compositions of the invention will cure at ordinary room temperatures on standing, it is sometimes desirable to use curing catalysts and elevated temperatures so as to alter the curing time and the properties of the finished propellant. Suitable curing catalysts include among others, metal complexes such as Ferrocene (dicyclopentadienyl iron) or 2,4-pentanedione complexes with cobalt, chromium, nickel or iron. The amount of curing catalyst, when used, will generally range from 0.01 to 5 parts by weight per 100 parts by weight of the nitramine polyurethane.

The curing temperature will be limited by the oxidant employed in some cases but will generally be in the range between 70 and 250° F., preferably between 140 and 200° F.

The curing time must be long enough to give required creep resistance and other mechanical properties in the propellant. The time will generally range from around two or three hours when the higher curing temperatures are employed to about seven days when curing is effected at lower temperatures.

Oxidants which are applicable in the solid propellant compositions of this invention are those oxygen-containing solids which readily give up oxygen and include, for example, ammonium, alkali metal, and alkaline earth metal salts of nitric and perchloric acids, and mixtures thereof. Ammonium nitrate and ammonium perchlorate are the preferred oxidizers for use in the solid propellants of this invention. Other specific oxidizers include sodium nitrate, potassium perchlorate, calcium nitrate, and barium perchlorate. Mixtures of oxidizers are also applicable. In the preparation of the solid rocket propellant compositions, the oxidizers are ground to a particle size, preferably within the range between 2 and 300 microns average particle size. The most preferred particle size is from 10–220 microns. The amount of solid oxidizer can be a major amount of the total propellant composition and is generally in the range between 40 and 90 percent by weight of the total propellant composition. In the castable propellant compositions of the invention the oxidizer content ranges from 40 to 80 weight percent of the total propellant composition.

Burning rate catalysts applicable in the invention include ammonium dichromate, and metal ferrocyanides and ferricyanides. Ferric ferrocyanides, such as Prussian, Berlin, Hamburg, Chinese, Paris, and Milori blue, soluble ferric ferrocyanide, such as soluble Berlin or Prussian blue which contains potassium ferric ferrocyanide, and ferric ferrocyanide which has been treated with ammonia, are among the materials which can be used. Ferrous ferricyanide, Turnbull's blue is also applicable. A particularly effective burning rate catalyst is Milori blue which is a pigment similar to Prussian blue but having a red tint and is prepared by the oxidation of a paste of potassium ferrocyanide and ferrous sulfate. Other metal compounds such as nickel and copper ferrocyanides can also be employed. The amount of burning rate catalyst used, in the propellant compositions of this invention, is usually in the range of 0 to 10 weight percent based on the total propellant composition.

Casting aids such as Kel-F Oil No. 1 (polytrifluro-chloroethylene) can also be included in the propellant compositions when desired.

It is to be understood that each of the various types of compounding ingredients can be used singly, or mixtures of various ingredients performing a certain function can be employed. It is sometimes preferred, for example, to use mixtures of plasticizers rather than a single material.

It is also within the scope of the invention to include high energy additives such as finely divided aluminum, magnesium, boron and other finely divided metals in the propellant compositions of the invention. Said finely divided high energy additives will usually have a particle size within the range of 1 to 50 microns and will usually be used in amounts within the range of 0 to 20 weight percent based on the total propellant composition.

A general formulation for the propellant compositions of the invention is as follows:

| | Parts by Weight | Weight percent |
|---|---|---|
| Binder | | 10–60 |
| Nitraza thia polymer or polyurethane | 100 | |
| Plasticizer | 0–250 | |
| Antioxidant | 0–25 | |
| Wetting agent | 0–25 | |
| Curing catalyst | 0–5 | |
| Casting aid | 0–5 | |
| Oxidizer | | 90–40 |
| High energy additive | | 0–30 |
| Burning rate catalyst | | 0–10 |

The various ingredients in the propellant compositions of the invention can be mixed in any suitable manner using any suitable type of mixing equipment. For example, a Baker-Perkins dispersion blade mixer or a Reed Compay standard sigma blade mixer can be used. In the final propellant composition the binder component forms a continuous phase with the oxidizer component being a discontinuous phase. The various ingredients of the propellant composition can all be mixed together in one step if desired. However, in a presently preferred mixing procedure the nitraza thia diol, the crosslinking agent being used (if one is used), and the plasticizer being used (if one is used) are placed in a suitable mixer, and the temperature is adjusted so that these ingredients are all in the liquid phase during initial mixing. This temperature is maintained throughout the remainder of the mixing procedure. The crystalline oxidizer is then added, along with any other solid ingredients, preferably in increments. Mixing is then continued for 5 to 15 minutes until a homogeneous mixture is obtained. The polyisocyanate and the cure catalyst (if one is used) are then added and mixing is continued until a homogeneous slurry or mixture is again obtained. Mixing temperatures are in the order of 60 to about 125° C. Any suitable mixing temperatures can be employed. Likewise, any suitable period of time sufficient to obtain the desired uniform mixing can be employed. Obviously the mixing times will depend somewhat upon the quantities being mixed, rate of stirring, etc.

Upon completion of the mixing, the finished propellant is poured into a mold for molding into finished propellant grains. If desired, the mold can be vibrated to insure proper flow and settling of the propellant composition within the mold, and to release any air which may have been entrapped during the mixing and casting process. The cast propellant grain in the mold is then cured by maintaining the mold at the required curing temperature within the temperature and time limits set forth above. Upon completion of the curing the finished grain is removed from the mold.

When it is desired to prepare the propellant grains by techniques other than casting, such as compression molding, the amount of the plasticizer used in the propellant composition is decreased in order to reduce the fluidity of said composition. In such instances, upon completion of the mixing step, the propellant composition is transferred to the mold and compressed to the desired shape under the desired pressure according to conventional techniques known to those skilled in the art.

As will be evident to those skilled in the art many specific propellant formulations having a wide variety of properties, depending upon the service requirements of the propellant, can be formulated within the scope of the above general formulation. Such propellants have good physical properties and good ballistic properties, particularly high specific impulse due to the combination of fuel and oxidizer elements combined in the molecule of the nitraza thia polymer which constitutes at least a portion of the binder component.

While certain embodiments of the invention have been described for illustrative purposes, the invention obviously is not limited thereto. Various other modifications will be apparent to those skilled in the art in view of this disclosure. Such modifications are within the spirit and scope of the invention.

I claim:

1. A nitraza thia polymeric composition of matter characterized by the formula

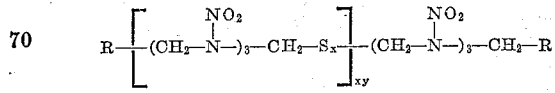

wherein: each R is selected from the group consisting of a chlorine atom and OH—CH$_2$—CH$_2$—O—, R'—O—, and R'—O—CH$_2$—CH$_2$—O— radicals wherein R' is a primary alkyl radical of from 1 to 4 carbon atoms; $x$ is an integer of from 1 to 5; and $y$ is an integer of from 1 to 100.

2. A process for the preparation of a chloro nitraza thia polymeric composition of matter characterized by the formula of claim 1, which process comprises reacting 1,7-dichloro-2,4,6-trinitrazaheptane with a sulfide having the formula $M_2S_z$ wherein: M is selected from the group consisting of ammonium, sodium, potassium, lithium, cesium, and rubidium; and $z$ is an integer of from 1 to 5.

3. A process for the preparation of a nitraza thia polymeric composition of matter, which process comprises reacting 1,7-dichloro-2,4,6-trinitrazaheptane with a sulfide having the formula $M_2S_x$ wherein M is selected from the group consisting of ammonium, sodium, potassium, lithium, cesium and rubidium and $z$ is an integer of from 1 to 5, in a heptane to sulfide mol ratio in the range of 0.5:1 to 2.0:1, in the presence of a suitable organic solvent which is inert under the reaction conditions, for a period of time in the range of 1 to 24 hours, and at a temperature in the range of 20 to 80° C.

4. A process for the preparation of a chloro nitraza thia polymeric composition of matter characterized by the formula of claim 1, which process comprises: dissolving 1,7-dichloro-2,4,6-trinitrazaheptane in a suitable organic solvent which is inert under the reaction conditions to form a first solution; adding an aqueous solution of a sulfide in a heptane to sulfide mol ratio in the range of 0.5:1 to 2.0:1 to said first solution with agitation to form a reaction mixture having an aqueous phase and a non-aqueous phase, said sulfide having the formula $M_2S_z$ wherein M is selected from the group consisting of ammonium, sodium, potassium, lithium, cesium, and rubidium, and $z$ is an integer of from 1 to 5; continuing agitation of said reaction mixture at a temperature within the range of 20 to 80° C. for a period of time within the range of 1 to 24 hours; separating said non-aqueous phase from said aqueous phase; and recovering said polymeric composition of matter from said non-aqueous phase.

5. A process for the preparation of a chloro nitraza thia polymeric composition of matter characterized by the formula of claim 1, which process comprises: dissolving 1,7-dichloro-2,4,6-trinitrazaheptane in dioxane to form a first solution; adding a saturated aqueous solution of a sulfide to said first solution with agitation and in an amount such that said heptane and said sulfide are present in a heptane to sulfide mol ratio in the range of 0.5:1 to 2.0:1 to form a reaction mixture having an aqueous phase and a non-aqueous phase, said sulfide having the formula $M_2S_z$ wherein M is selected from the group consisting of ammonium, sodium, potassium, lithium, cesium, and rubidium, and $z$ is an integer of from 1 to 5; continuing agitation of said reaction mixture at a temperature within the range of 30 to 50° C. for a period of time in the range of 3 to 6 hours; separating said non-aqueous phase from said aqueous phase; removing suspended solids from said non-aqueous phase by filtering same through a bed of finely divided solid inert filter medium; and recovering said polymeric composition of matter from said filtered non-aqueous phase.

6. A chloro nitraza thia polymeric composition of matter characterized by the formula

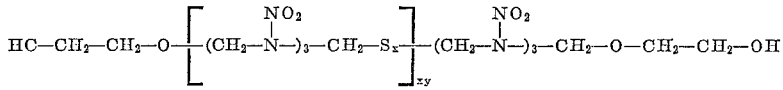

wherein: $x$ is an integer of from 1 to 5; and $y$ is an integer of from 1 to 100.

7. A diol nitraza thia polymeric composition of matter characterized by the formula

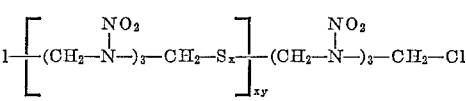

wherein: $x$ is an integer of from 1 to 5; and $y$ is an integer of from 1 to 100.

8. A process for preparing a diol nitraza thia polymeric composition of matter characterized by the formula

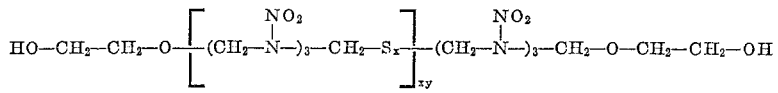

wherein: $x$ is an integer of from 1 to 5, and $y$ is an integer of from 1 to 100, which process comprises reacting a chloro nitraza thia polymer characterized by the formula

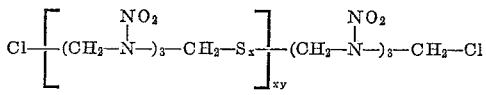

wherein $x$ and $y$ are as defined above, with ethylene glycol in a glycol to polymer weight ratio in the range of 2:1 to 10:1, for a period of time within the range of 1 to 24 hours, and at a temperature within the range of 40 to 100° C.

9. A diether nitraza thia polymeric composition of matter characterized by the formula

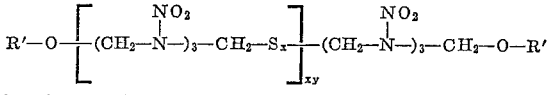

wherein: R' is a primary alkyl radical containing from 1 to 4 carbon atoms; $x$ is an integer of from 1 to 5; and $y$ is an integer of from 1 to 100.

10. A process for preparing a diether nitraza thia polymeric composition of matter characterized by the formula

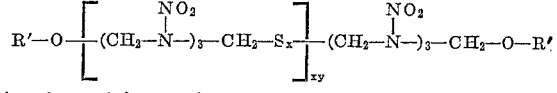

wherein: R' is a primary alkyl radical containing from 1 to 4 carbon atoms; $x$ is an integer of from 1 to 5, and $y$ is an integer of from 1 to 100, which process comprises reacting a chloro nitraza thia polymer characterized by the formula

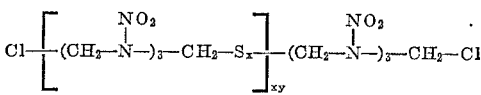

wherein $x$ and $y$ are as defined above, with a primary saturated aliphatic alcohol containing from 1 to 4 carbon atoms, in an alcohol to polymer weight ratio in the range of 2:1 to 10:1, for a period of time within the range of 1 to 24 hours and at a temperature within the range of 40 to 90° C.

11. A diether oxa nitraza thia polymeric composition of matter characterized by the formula

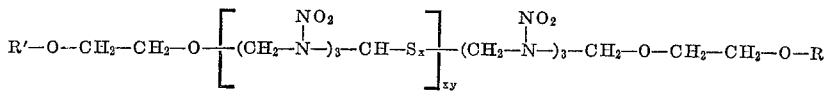

wherein: R' is a primary alkyl radical containing from 1 to 4 carbon atoms; $x$ is an integer of from 1 to 5; and $y$ is an integer of from 1 to 100.

12. A process for preparing a diether oxa nitraza thia polymeric composition of matter characterized by the formula

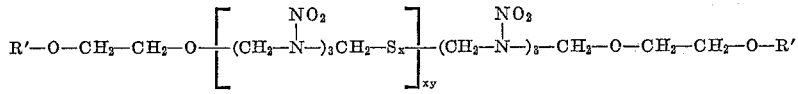

wherein: R' is a primary alkyl radical containing from 1 to 4 carbon atoms; $x$ is an integer of from 1 to 5; and $y$ is an integer of from 1 to 100, which process comprises reacting a chloro nitraza thia polymer characterized by the formula

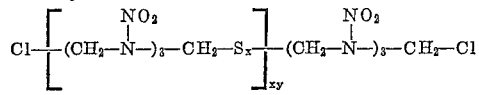

wherein $x$ and $y$ are as defined above, with a glycol ether having the formula R'—O—$CH_2$—$CH_2$—OH wherein R' is a primary alkyl radical containing from 1 to 4 carbon atoms, in a glycol ether to polymer weight ratio in the range of 2:1 to 10:1, for a period of time within the range of 1 to 24 hours, and at a temperature within the range of 50 to 100° C.

References Cited in the file of this patent
UNITED STATES PATENTS

| | | |
|---|---|---|
| 2,411,275 | Kinneberg et al. | Nov. 19, 1946 |
| 2,418,938 | Izard | Apr. 15, 1947 |
| 2,597,025 | Orth | May 20, 1952 |
| 2,692,874 | Langerak | Oct. 26, 1954 |
| 2,740,702 | Mace | Apr. 3, 1956 |
| 2,744,816 | Hutchison | May 8, 1956 |

UNITED STATES PATENT OFFICE
CERTIFICATE OF CORRECTION

Patent No. 3,151,164                  September 29, 1964

George D. Sammons

It is hereby certified that error appears in the above numbered patent requiring correction and that the said Letters Patent should read as corrected below.

Column 12, lines 12 to 17, left-hand portion of the formula, for "$HC-CH_2-CH_2-O-$" read -- $HO-CH_2-CH_2-O-$ --; same column 12, lines 72 to 75, right-hand portion of the formula, for "$-CH_2-O-R$" read -- $-CH_2-O-R'$ --.

Signed and sealed this 6th day of July 1965.

(SEAL)
Attest:

ERNEST W. SWIDER
Attesting Officer

EDWARD J. BRENNER
Commissioner of Patents